US011466112B2

(12) United States Patent
Kim et al.

(10) Patent No.: US 11,466,112 B2
(45) Date of Patent: Oct. 11, 2022

(54) CARBOXYLIC ACID MODIFIED NITRILE BASED COPOLYMER LATEX, METHOD FOR PREPARING THE COPOLYMER LATEX, LATEX COMPOSITION FOR DIP-FORMING COMPRISING THE COPOLYMER LATEX AND ARTICLE FORMED BY THE COMPOSITION

(71) Applicant: LG Chem, Ltd., Seoul (KR)

(72) Inventors: Ji Hyun Kim, Daejeon (KR); Jung Eun Kim, Daejeon (KR); Yong Seok Jung, Daejeon (KR)

(73) Assignee: LG Chem, Ltd.

( * ) Notice: Subject to any disclaimer, the term of this patent is extended or adjusted under 35 U.S.C. 154(b) by 368 days.

(21) Appl. No.: 16/481,884

(22) PCT Filed: Dec. 5, 2018

(86) PCT No.: PCT/KR2018/015300
§ 371 (c)(1),
(2) Date: Jul. 30, 2019

(87) PCT Pub. No.: WO2019/112312
PCT Pub. Date: Jun. 13, 2019

(65) Prior Publication Data
US 2020/0040118 A1    Feb. 6, 2020

(30) Foreign Application Priority Data

Dec. 7, 2017 (KR) .................. 10-2017-0167452

(51) Int. Cl.
| | |
|---|---|
| C08F 236/12 | (2006.01) |
| C08F 8/34 | (2006.01) |
| C08F 8/46 | (2006.01) |
| C08K 3/16 | (2006.01) |
| C08K 3/22 | (2006.01) |
| C08K 3/30 | (2006.01) |
| C08L 9/04 | (2006.01) |

(52) U.S. Cl.
CPC .............. *C08F 236/12* (2013.01); *C08F 8/34* (2013.01); *C08F 8/46* (2013.01); *C08K 3/16* (2013.01); *C08K 3/22* (2013.01); *C08K 3/30* (2013.01); *C08L 9/04* (2013.01)

(58) Field of Classification Search
CPC .. C08F 236/12; C08F 8/34; C08F 8/46; C08L 9/04; C08K 3/22; C08K 3/30; C08K 3/16
See application file for complete search history.

(56) References Cited

U.S. PATENT DOCUMENTS

| | | | |
|---|---|---|---|
| 4,289,861 A | 9/1981 | Onizawa | |
| 6,080,806 A | 6/2000 | Bett et al. | |
| 2004/0010067 A1* | 1/2004 | Ota | B29C 41/14 |
| | | | 524/432 |
| 2010/0152365 A1 | 6/2010 | Han et al. | |
| 2010/0236716 A1 | 9/2010 | Hisha et al. | |
| 2011/0190414 A1 | 8/2011 | Hisha et al. | |
| 2011/0229646 A1 | 9/2011 | Kim et al. | |
| 2012/0246799 A1 | 10/2012 | Khoo et al. | |

FOREIGN PATENT DOCUMENTS

| | | |
|---|---|---|
| CN | 102159604 A | 8/2011 |
| CN | 102504082 A | 6/2012 |
| CN | 102725342 A | 10/2012 |
| CN | 102887976 A | 1/2013 |
| CN | 104774295 A | 7/2015 |
| CN | 104936626 A | 9/2015 |
| KR | 19990077129 A | 10/1999 |
| KR | 100293743 B1 | 8/2001 |
| KR | 20100035191 A | 4/2010 |
| KR | 20100058459 A | 6/2010 |
| KR | 20100069621 A | 6/2010 |
| KR | 20110052222 A | 5/2011 |
| KR | 20110082548 A | 7/2011 |
| KR | 20120099102 A | 9/2012 |
| KR | 20140141069 A | 12/2014 |
| KR | 20150115746 A | 10/2015 |
| KR | 20170060793 A | 6/2017 |

(Continued)

OTHER PUBLICATIONS

Chinese Search Report for Application No. 201880007547.0 dated Apr. 15, 2021, pp. 1-3.
Fang, Zuo et al., "Study on Polymer Gels Based on the Interaction of Phenylboronate and Catechol", Journal of Southwest University for Nationalities, Natural Science Edition, May 2013, pp. 336-340, Chengdu, China. (Providing English Translation of Abstract only).
Yang, Juan et al., "The effect of molecular composition and crosslinking on adhesion of a bio-inspired adhesive", Polymer Chemistry, Feb. 2015, pp. 3121-3130, vol. 6, The Royal Society of Chemistry.
Chung et al., Enhanced Adhesion of Dopamine Methacrylamide Elastomers via Viscoelasticity Tuning, published on web Dec. 2010, pp. 342-347, vol. 12, No. 2, American Chemical Society.
International Search Report for Application No. PCT/KR2018/015300, dated Mar. 11, 2019, pp. 1-4.

*Primary Examiner* — Robert D Harlan
(74) *Attorney, Agent, or Firm* — Lerner, David, Littenberg, Krumholz & Mentlik, LLP

(57) ABSTRACT

Provided is a carboxylic acid-modified nitrile-based copolymer latex, and more particularly, provided are a carboxylic acid-modified nitrile-based copolymer latex which includes a carboxylic acid-modified nitrile-based copolymer including a monomer-derived repeating unit; and a repeating unit derived from a monomer represented by Chemical Formula 1 below, the monomer-derived repeating unit including a conjugated diene-based monomer-derived repeating unit, an ethylenically unsaturated nitrile-based monomer-derived repeating unit, and an ethylenically unsaturated acid monomer-derived repeating unit (see description of the present invention), a method for preparing a carboxylic acid-modified nitrile-based copolymer latex, a latex composition for dip-forming including the copolymer latex, and an article formed by the composition.

13 Claims, No Drawings

(56) References Cited

FOREIGN PATENT DOCUMENTS

| WO | 2008049108 A1 | 4/2008 |
| WO | 2014118382 A1 | 8/2014 |

\* cited by examiner

CARBOXYLIC ACID MODIFIED NITRILE BASED COPOLYMER LATEX, METHOD FOR PREPARING THE COPOLYMER LATEX, LATEX COMPOSITION FOR DIP-FORMING COMPRISING THE COPOLYMER LATEX AND ARTICLE FORMED BY THE COMPOSITION

CROSS-REFERENCE TO RELATED APPLICATIONS

The present application is a National Phase Entry under 35 U.S.C. § 371 of International Application No. PCT/KR2018/015300 filed Dec. 5, 2018, which claims priority from Korean Patent Application No. 10-2017-0167452, filed Dec. 7, 2017, all of which are incorporated herein by reference.

TECHNICAL FIELD

The present invention relates to a carboxylic acid-modified nitrile-based copolymer latex, and more particularly, to a carboxylic acid-modified nitrile-based copolymer latex, a method for preparing a carboxylic acid-modified nitrile-based copolymer latex, a latex composition for dip-forming including the copolymer latex, and an article formed by the composition.

BACKGROUND ART

In general, natural rubber is mainly used as raw material of products requiring elasticity such as industrial, medical and food gloves, and the like. However, the natural rubber has a side effect causing a severe protein allergic reaction in some users, and thus a glove made by dip-forming a latex composition in which a synthetic rubber latex, for example, a carboxylic acid-modified nitrile-based copolymer latex such as acrylic acid-acrylonitrile-butadiene copolymer latex, or the like, is blended with sulfur and a vulcanization accelerator is widely used.

However, when the work is continued while wearing the rubber glove blended with sulfur and the vulcanization accelerator as essential components for a long period of time, the smell caused by sulfur may give an unpleasant feeling or the color of the glove may be discolored, thus reducing a product value, and tingling may be caused due to an allergic reaction in some users. Further, there is a problem that the water resistance of the glove is lowered due to the vulcanization accelerator added for ion crosslinking between carboxyl groups in the latex composition.

In order to solve this problem, there is an attempt not to use sulfur and the vulcanization accelerator. However, in this case, the glove has poor durability, causing a problem that the gloves are torn when the gloves are worn for a long period of time, and a protective function of gloves is lowered since chemical resistance to solvents or organic substances is deteriorated.

Therefore, it is necessary to continuously research and develop a non-sulfur and non-vulcanization accelerator glove while ensuring durability and chemical resistance of the glove.

DISCLOSURE

Technical Problem

An object of the present invention is to provide a dip-formed article capable of preventing allergy and having improved durability and chemical resistance, such as a glove, or the like, made by dip-forming a latex composition for dip-forming including a carboxylic acid-modified nitrile-based copolymer latex.

That is, the present invention has been made to solve the above-described problems of the related art. An object of the present invention is to provide a carboxylic acid-modified nitrile-based copolymer latex by inducing crosslinking through ionic bonding or covalent bonding of a polyvalent metal cation compound to a latex composition for dip-forming including a carboxylic acid-modified nitrile-based copolymer latex, without using sulfur and a vulcanization accelerator and prepared so that a large amount of a material capable of binding to a polyvalent metal cation compound is present on a copolymer particle surface of the carboxylic acid-modified nitrile-based copolymer latex in order to increase binding force at the time of the ion bonding or covalent bonding, capable of maintaining physical properties of the dip-formed article at the same level or higher, and securing durability and chemical resistance, a method for preparing a carboxylic acid-modified nitrile-based copolymer latex, a latex composition for dip-forming including the copolymer latex, and an article formed by the composition.

Technical Solution

In one general aspect, a carboxylic acid-modified nitrile-based copolymer latex includes: a carboxylic acid-modified nitrile-based copolymer including a monomer-derived repeating unit; and a repeating unit derived from a monomer represented by Chemical Formula 1 below, the monomer-derived repeating unit including a conjugated diene-based monomer-derived repeating unit, an ethylenically unsaturated nitrile-based monomer-derived repeating unit, and an ethylenically unsaturated acid monomer-derived repeating unit:

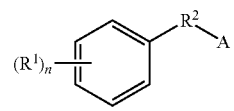

[Chemical Formula 1]

in Chemical Formula 1, $R^1$ may be a hydroxyl group or a mercapto group, $R^2$ may be a C1-C10 alkylene group, A may be an unsaturated group, and n may be an integer selected from 1 to 5.

In another general aspect, a method for preparing a carboxylic acid-modified nitrile-based copolymer latex, includes: adding and polymerizing a monomer including a conjugated diene-based monomer, an ethylenically unsaturated nitrile-based monomer, and an ethylenically unsaturated acid monomer; and the monomer represented by Chemical Formula 1 above or a polymer including a repeating unit derived from the monomer represented by Chemical Formula 1 above (S10).

In still another general aspect, there is provided a latex composition for dip-forming including the carboxylic acid-modified nitrile-based copolymer latex.

In still another general aspect, there is provided an article including a layer derived from the latex composition for dip-forming as described above.

Advantageous Effects

When a carboxylic acid-modified nitrile-based copolymer latex is prepared according to the present invention and a dip-formed article is formed by using the latex composition for dip-forming including the same, it is possible to induce crosslinking through ionic bonding or covalent bonding of a polyvalent metal cation compound without using sulfur and a vulcanization accelerator, to maintain physical properties of the dip-formed article at the same level or higher, and to secure durability against human sweat, and the like, and chemical resistance against solvents, organic substances, and the like.

BEST MODE

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode.

Hereinafter, the present invention will be described in more detail to assist in understanding the technical idea of the present invention.

The term "monomer" used herein may mean a monomer mixture for forming a carboxylic acid-modified nitrile-based copolymer, and specifically, may refer to a monomer mixture including a conjugated diene-based monomer, an ethylenically unsaturated nitrile-based monomer and an ethylenically unsaturated acid monomer.

The term "monomer-derived repeating unit" used herein may refer to a component, structure, or a material itself resulting from each monomer, and may refer to a repeating unit formed in the polymer when monomers to be added participate in a polymerization reaction to form the polymer.

The term "latex" in the present invention may mean that a polymer or a copolymer polymerized by polymerization is present in a form dispersed in water. Specifically, the latex may mean that fine particles of a rubber-like polymer or fine particles of a rubber-like copolymer polymerized by emulsion polymerization are present in a colloidal state in which the fine particles are dispersed in water.

The term "layer derived" in the present invention may refer to a layer formed from a polymer or a copolymer. As a specific example, the layer derived may mean a layer formed from a polymer or a copolymer by attaching, fixing, and/or polymerizing the polymer or the copolymer on a dip forming mold at the time of manufacturing a dip-formed article.

The carboxylic acid-modified nitrile-based copolymer according to the present invention may include: a carboxylic acid-modified nitrile-based copolymer including a monomer-derived repeating unit; and a repeating unit derived from a monomer represented by Chemical Formula 1 below, the monomer-derived repeating unit including a conjugated diene-based monomer-derived repeating unit, an ethylenically unsaturated nitrile-based monomer-derived repeating unit, and an ethylenically unsaturated acid monomer-derived repeating unit:

[Chemical Formula 1]

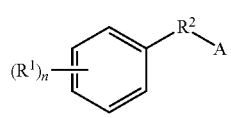

in Chemical Formula 1, $R^1$ may be a hydroxyl group or a mercapto group, $R^2$ may be a C1-C10 alkylene group, A may be an unsaturated group, and n may be an integer selected from 1 to 5.

According to an embodiment of the present invention, the carboxylic acid-modified nitrile-based copolymer latex may include the repeating unit derived from the monomer represented by Chemical Formula 1, and thus many functional groups for ionic bonding and covalent bonding may be disposed on a surface of the copolymer particles. Thus, a binding force of the ionic boning or the covalent bonding with a polyvalent metal cation compound included as a crosslinking agent instead of sulfur and a vulcanization accelerator, or the like, in the latex composition for dip-forming to be described below may be improved. Accordingly, at the time of manufacturing a dip-formed article, a crosslinking ability between the carboxylic acid-modified nitrile-based copolymers may be improved to provide the manufactured dip-formed article having excellent physical properties such as tensile properties, and the like, and excellent durability and chemical resistance.

According to an embodiment of the present invention, the monomer-derived repeating unit of the carboxylic acid-modified nitrile-based copolymer may include 40 wt % to 89 wt % of the conjugated diene-based monomer-derived repeating unit, 10 wt % to 50 wt % of the ethylenically unsaturated nitrile-based monomer-derived repeating unit, and 0.1 wt % to 15 wt % of the ethylenically unsaturated acid monomer-derived repeating unit.

According to an embodiment of the present invention, the conjugated diene-based monomer forming the conjugated diene-based monomer-derived repeating unit among the monomer-derived repeating units may be at least one selected from the group consisting of 1,3-butadiene, 2,3-dimethyl-1,3-butadiene, 2-ethyl-1,3-butadiene, 1,3-pentadiene, and isoprene. More specifically, the conjugated diene-based monomer may be 1,3-butadiene or isoprene, and further specifically, 1,3-butadiene. An amount of the conjugated diene-based monomer-derived repeating unit may be 40 wt % to 89 wt %, 45 wt % to 80 wt %, or 50 wt % to 78 wt % based on the total amount of the monomer-derived repeating unit. Within this range, the dip-formed article formed from the latex composition for dip-forming including the carboxylic acid-modified nitrile-based copolymer is flexible and has excellent wearing feeling and excellent oil resistance and tensile strength.

Further, according to an embodiment of the present invention, among the monomer-derived repeating unit, an ethylenically unsaturated nitrile-based monomer forming the ethylenically unsaturated nitrile-based monomer-derived repeating unit may be at least one selected from the group consisting of acrylonitrile, methacrylonitrile, fumaronitrile, α-chloronitrile, and α-cyanoethyl acrylonitrile. Specifically, the ethylenically unsaturated nitrile-based monomer may be acrylonitrile and methacrylonitrile, and more specifically, may be acrylonitrile. An amount of the ethylenically unsaturated nitrile-based monomer-derived repeating unit may be 10 wt % to 50 wt %, 15 wt % to 45 wt %, or 20 wt % to 40 wt % based on the total amount of the monomer-derived repeating unit. Within this range, the dip-formed article formed from the latex composition for dip-forming including the carboxylic acid-modified nitrile-based copolymer is flexible and has excellent wearing feeling and excellent oil resistance and tensile strength.

Further, according to an embodiment of the present invention, among the monomer-derived repeating units, an ethylenically unsaturated acid monomer forming the ethylenically unsaturated acid monomer-derived repeating unit may be an ethylenically unsaturated monomer containing an acid group such as a carboxyl group, a sulfonic acid group or an acid anhydride group. Specific examples of the ethylenically unsaturated acid monomer may include ethylenically unsaturated carboxylic acid monomers such as acrylic acid, methacrylic acid, itaconic acid, maleic acid, and fumaric acid, and the like; polycarboxylic anhydrides such as maleic anhydride, and citraconic anhydride, and the like; ethylenically unsaturated sulfonic acid monomers such as styrenesulfonic acid; ethylenically unsaturated polycarboxylic acid partial ester monomers such as monobutyl fumarate, monobutyl maleate, mono-2-hydroxypropyl maleate, and the like. More specifically, the ethylenically unsaturated acid monomer may be at least one selected from the group consisting of acrylic acid, methacrylic acid, itaconic acid, maleic acid, fumaric acid, and the like, and more preferably methacrylic acid. The ethylenically unsaturated acid monomer may be used in the form of a salt such as an alkali metal salt, an ammonium salt, or the like, at the time of polymerization. Further, an amount of the ethylenically unsaturated acid monomer-derived repeating unit may be 0.1 wt % to 15 wt %, 0.5 wt % to 9 wt %, or 1 wt % to 8 wt % based on the total amount of the monomer-derived repeating unit. Within this range, the dip-formed article formed from the latex composition for dip-forming including the carboxylic acid-modified nitrile-based copolymer is flexible and has excellent wearing feeling and excellent tensile strength.

According to an embodiment of the present invention, the carboxylic acid-modified nitrile-based copolymer may further include an ethylenically unsaturated monomer-derived repeating unit derived from an ethylenically unsaturated monomer capable of copolymerizing a monomer represented by Chemical Formula 1 above, in addition to the monomer including the conjugated diene-based monomer, the ethylenically unsaturated nitrile-based monomer, and the ethylenically unsaturated acid monomer.

According to an embodiment of the present invention, the ethylenically unsaturated monomer forming the ethylenically unsaturated monomer-derived repeating unit may be at least one selected from the group consisting of aromatic vinyl monomers such as styrene, aryl styrene, and vinyl naphthalene, and the like; fluoroalkyl vinyl ethers such as fluoroethyl vinyl ether, and the like; ethylenically unsaturated amide monomers such as (meth)acrylamide, N-methylol (meth)acrylamide, N,N-dimethylol (meth)acrylamide, N-methoxymethyl (meth)acrylamide, and N-propoxymethyl (meth)acrylamide, and the like; non-conjugated monomers such as vinylpyridine, vinylnorbornene, dicyclopentadiene, and 1,4-hexadiene, and the like; ethylenically unsaturated carboxylic acid ester monomers such as methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth) acrylate, cyanomethyl (meth)acrylate, 2-cyanoethyl (meth) acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate and dimethylaminoethyl (meth) acrylate, and the like. Further, when the ethylenically unsaturated monomer-derived repeating unit is included, an amount of the ethylenically unsaturated monomer-derived repeating unit may be 0.001 wt % to 20 wt % based on the total amount of the monomer. Within this range, the balance between tensile strength and soft touch of the dip-formed article may be excellent.

According to an embodiment of the present invention, the repeating unit derived from the monomer represented by Chemical Formula 1 may be formed by direct addition and polymerization of the monomer represented by Chemical Formula 1 above, and as another example, the repeating unit derived from the monomer represented by Chemical Formula 1 may be formed by adding and polymerizing a polymer including the repeating unit derived from the monomer represented by Chemical Formula 1.

According to an embodiment of the present invention, in the monomer represented by Chemical Formula 1, the unsaturated group represented by A may be a functional group for participating in the polymerization reaction to form a repeating unit at the time of the polymerization of the carboxylic acid-modified nitrile-based copolymer, and as a specific example, the unsaturated group may be an unsaturated group including N atoms. Further, in the case of the phenyl group having n $R^1$ substituents, the unsaturated group may be present on the surface of the carboxylic acid-modified nitrile-based copolymer particles due to the repeating unit derived from the monomer represented by Chemical Formula 1, and may form a covalent bond with a hydroxyl group or a mercapto group of the $R^1$ group or may form an anion resulting from separation of a hydrogen atom of the hydroxy group or the mercapto group of the $R^1$ group, thereby serving to enhance a binding force of the polyvalent metal cation compound in the latex composition for dip-forming to be described below. Further, $R^2$ is a linking group for connecting the phenyl group having n $R^1$ substituents and the unsaturated group represented by A, and may be adjusted according to formulation for components of the latex composition for dip-forming. As a specific example, in Chemical Formula 1, $R^1$ may be a hydroxyl group, $R^2$ may be a C1-C5 alkylene group, A may be a (meth)acrylamide group, an allyl amide group, an α-amino acid group or a β-amino acid group, and n may be an integer selected from 2 to 3. In this case, the dip-formed article formed from the latex composition for dip-forming including the carboxylic acid-modified nitrile-based copolymer latex may have excellent durability and chemical resistance.

Further, according to an embodiment of the present invention, the monomer represented by Chemical Formula 1 may be represented by Chemical Formula 2 below:

[Chemical Formula 2]

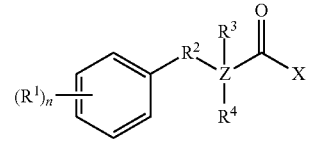

in Chemical Formula 2, $R^1$ may be a hydroxyl group or a mercapto group, $R^2$ may be a C1-C10 alkylene group, $R^3$ and $R^4$ may be each independently hydrogen, a C1-C10 alkyl group, or an amine group, Z may be a carbon atom or a nitrogen atom, provided that when Z is the carbon atom, at least one of $R^3$ and $R^4$ may be necessarily an amine group, and when Z is the nitrogen atom, $R^3$ is not present, X may be a hydroxyl group, a vinyl group, an allyl group or a 2-isopropenyl group, and n may be an integer selected from 1 to 5. As a specific example, in Chemical Formula 2, $R^1$ may be a hydroxyl group, $R^2$ may be a C1-C5 alkylene group, $R^3$ and $R^4$ may be each independently hydrogen, a C1-C5 alkyl group, or an amine group, Z may be a carbon atom or a nitrogen atom, provided that when Z is the carbon atom, at least one of $R^3$ and $R^4$ may be necessarily an amine group, and when Z is the nitrogen atom, $R^3$ is not present, X may be a hydroxyl group, a vinyl group, an allyl group or a 2-isopropenyl group, and n may be an integer selected from 2 to 3. As a more specific example, in Chemical Formula 2, $R^1$ may be a hydroxyl group, $R^2$ may be a C1-C3 alkylene group, $R^3$ and $R^4$ may be each independently hydrogen, or an amine group, Z may be a carbon atom or a nitrogen atom, provided that when Z is the carbon atom, at least one of $R^3$ and $R^4$ may be necessarily an amine group, X may be a hydroxyl group, when Z is the nitrogen atom, $R^3$ is not present, X may be a vinyl group, an allyl group or a 2-isopropenyl group, and n may be 2.

In addition, according to an embodiment of the present invention, the monomer represented by Chemical Formula 1 may be at least one selected from the group consisting of dopamine (meth)acrylamide, 3,4-dihydroxyphenylalanine, N-acetyldopamine, N-(3,4-dihydroxyphenethyl)acrylamide, dopamine allylamide, and tyrosine.

Further, according to an embodiment of the present invention, an amount of the repeating unit derived from the monomer represented by Chemical Formula 1 may be 0.5 to 5 parts by weight, 0.6 to 4.5 parts by weight, or 0.8 to 4 parts by weight based on 100 parts by weight of the total amount of the monomer-derived repeating unit. Within this range, external crosslinking may be formed together with a polyvalent metal cation compound to provide the dip-formed article having excellent durability and chemical resistance and excellent feeling when worn.

According to an embodiment of the present invention, the carboxylic acid-modified nitrile-based copolymer latex may have a glass transition temperature of −50° C. to −15° C., or −45° C. to −20° C. Within this range, the article obtained by dip-forming the latex composition for dip-forming including the carboxylic acid-modified nitrile-based copolymer latex may have less stickiness while preventing generation of cracks and deterioration of tensile properties such as the tensile strength, elongation force, and the like, thus having excellent wearing feeling. The glass transition temperature may be measured using a differential scanning calorimetry.

Further, according to an embodiment of the present invention, an average particle size of carboxylic acid-modified nitrile-based copolymer particles in the carboxylic acid-modified nitrile-based copolymer latex may be 100 nm to 500 nm, 100 nm to 200 nm, or 110 nm to 180 nm. Within this range, the article obtained by dip-forming the latex composition for dip-forming including the carboxylic acid-modified nitrile-based copolymer latex may have excellent tensile properties such as tensile strength, and the like. The average particle size may be measured using a laser scattering analyzer (Nicomp).

Further, according to an embodiment of the present invention, a solid concentration of the carboxylic acid-modified nitrile-based copolymer latex may be 20 wt % to 50 wt %. Within this range, an efficiency of transporting latex is excellent, and storage stability is excellent by preventing an increase in latex viscosity.

Further, according to an embodiment of the present invention, the carboxylic acid-modified nitrile-based copolymer latex may have a pH of 8 to 12. Within this range, when the dip-formed article is manufactured by using the latex composition for dip-forming including the carboxylic acid-modified nitrile-based copolymer latex, processability and productivity may be excellent. The pH of the carboxylic acid-modified nitrile-based copolymer latex may be adjusted by addition of a pH adjuster described below. The pH adjuster may be, for example, an aqueous solution of potassium hydroxide having a concentration of 1 wt % to 5 wt %, or ammonia water having a concentration of 1 wt % to 5 wt %.

Further, according to the present invention, there is also provided a method for preparing a carboxylic acid-modified nitrile-based copolymer latex for preparing the carboxylic acid-modified nitrile-based copolymer latex. The method for preparing a carboxylic acid-modified nitrile-based copolymer latex may include: adding and polymerizing a monomer including a conjugated diene-based monomer, an ethylenically unsaturated nitrile-based monomer, and an ethylenically unsaturated acid monomer; and a monomer represented by Chemical Formula 1 below or a polymer including a repeating unit derived from the monomer represented by Chemical Formula 1 below (S10):

[Chemical Formula 1]

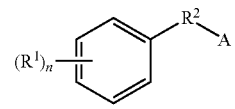

in Chemical Formula 1, the definition of each substituent is the same as described above.

According to an embodiment of the present invention, the polymerization in step (S10) may be performed by emulsion polymerization. The polymerization in step (S10) may be performed by polymerization of the monomer and the monomer represented by Chemical Formula 1. As each of the monomers included in the monomer and the monomer represented by Chemical Formula 1, the above-described kind of monomers may be added at each amount as described above.

Meanwhile, at the time of the polymerization of step (S10), an entire amount of each of the conjugated diene-based monomer, the ethylenically unsaturated nitrile-based monomer, the ethylenically unsaturated acid monomer, the monomer represented by Chemical Formula 1, and the polymer including the repeating unit derived from the monomer represented by Chemical Formula 1 may be independently added before the polymerization is initiated; or a part thereof may be added before the polymerization is initiated and the remaining amount thereof may be added at a polymerization conversion rate of 10% to 50% after the polymerization is initiated; or the entire amount thereof may be added at a polymerization conversion rate of 10% to 50% after the polymerization is initiated. Meanwhile, the monomer to be added with the entire amount at the polymerization conversion rate of 10% to 50% after the polymerization is initiated is limited to a part of the conjugated diene-based monomer, the ethylenically unsaturated nitrile-based monomer, the ethylenically unsaturated acid monomer, the monomer represented by Chemical Formula 1, and the polymer including the repeating unit derived from the monomer represented by Chemical Formula 1. As a specific example, at the time of the polymerization of step (S10), the monomer including the conjugated diene-based monomer, the ethylenically unsaturated nitrile-based monomer, and the ethylenically unsaturated acid monomer may be added with an entire amount before the polymerization is initiated; and the monomer represented by Chemical Formula 1, or the polymer including the repeating unit derived from the monomer represented by Chemical Formula 1 may be added with an entire amount at a polymerization conversion rate of 10% to 50% after the polymerization is initiated. In this case, the amount of the repeating unit derived from the monomer represented by Chemical Formula 1 may increase on the surface of the copolymer particles of the prepared carboxylic acid-modified nitrile-based copolymer latex. Thus, the repeating unit derived from the monomer represented by Chemical Formula 1 may be concentrated and distributed on the surface of the copolymer particles of the carboxylic acid-modified nitrile-based copolymer latex, and thus it is easy to form external crosslinking together with the polyvalent metal cation compound, and the manufactured dip-formed article has excellent durability and excellent chemical resistance.

Meanwhile, the monomer, the monomer represented by Chemical Formula 1 and the polymer including the repeating unit derived from the monomer represented by Chemical Formula 1 may be each independently added at a time or continuously according to timing of the addition. According to an embodiment of the present invention, the polymerization conversion rate may be calculated by the following Equation 1 below after collecting a predetermined amount of a sample from a composition under reaction at a predetermined time interval and measuring an amount of a solid content in the sample:

Polymerization conversion rate $(\%) = (Ms - Mo)/(Mp - M'o)$    [Equation 1]

in Equation 1 above, Ms is a weight of a dried copolymer, Mo is the sum of a weight of an emulsifier and a weight of a polymerization initiator, Mp is a weight of the 100% polymerized copolymer, and M'o is the sum of a weight of the emulsifier and a weight of the polymerization initiator.

Further, according to an embodiment of the present invention, the polymer including the repeating unit derived from the monomer represented by Chemical Formula 1 may have a weight average molecular weight of 100 g/mol to 200,000 g/mol, 150 g/mol to 170,000 g/mol, or 200 g/mol to 150,000 g/mol. Within this range, it is easy to add the polymer as the repeating unit in the carboxylic acid-modified nitrile-based copolymer, and it is possible to prevent an increase in viscosity of the carboxylic acid-modified nitrile-based copolymer latex and the latex composition for dip-foaming including the same, thus having excellent productivity.

Further, according to an embodiment of the present invention, the polymerization in step (S10) may be performed in the presence of an emulsifier, a polymerization initiator, a molecular weight modifier, and the like. When the polymerization in step (S10) is performed by including the emulsifier, the emulsifier may be at least one selected from the group consisting of an anionic surfactant, a nonionic surfactant, a cationic surfactant and a positive surfactant. Specific examples of the emulsifier may include at least one anionic surfactant selected from the group consisting of alkylbenzenesulfonic acid salts, aliphatic sulfonic acid salts, higher alcohol sulfuric acid ester salts, α-olefin sulfonic acid salts, and alkyl ether sulfuric acid ester salts. Further, the emulsifier may be added in an amount of 0.3 to 10 parts by weight, 0.8 to 8 parts by weight, or 1.5 to 8 parts by weight based on 100 parts by weight of the total amount of the monomer. Within this range, polymerization stability is excellent and a bubble generation amount is small, thus facilitating the manufacturing of the article.

Further, when the polymerization in step (S10) is performed by including the polymerization initiator, the polymerization initiator may be, for example, a radical initiator. As a specific example, the polymerization initiator may be at least one selected from the group consisting of inorganic peroxides such as sodium persulfate, potassium persulfate, ammonium persulfate, potassium perphosphate, and hydrogen peroxide, and the like; organic peroxides such as t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, and t-butyl peroxyisobutyrate, and the like; nitrogen compounds such as azobisisobutylonitrile, azobis-2,4-dimethylvaleronitrile, azobiscyclohexanecarbonitrile, and azobis isobutyric acid (butyl acid) methyl, and the like. As a specific example, the polymerization initiator may be an inorganic peroxide, and more specifically, a persulfate. Further, the polymerization initiator may be added in an amount of 0.01 to 2 parts by weight, 0.02 to 1.5 parts by weight, or 0.05 to 1 part by weight based on 100 parts by weight of the total amount of the monomer. Within this range, a polymerization rate may be maintained at an appropriate level.

Further, when the polymerization in step (S10) is performed by including a molecular weight modifier, the molecular weight modifier may be, for example, at least one selected from the group consisting of an α-methylstyrene dimer; mercaptans such as t-dodecylmercaptan, n-dodecylmercaptan and octylmercaptan, and the like; halogenated hydrocarbons such as carbon tetrachloride, methylene chloride, and methylene bromide, and the like; and sulfur-containing compounds such as tetraethylthiuram disulfide, dipentamethylenethiuramdisulfide, and diisopropylxanthogen disulfide, and the like, and may be specifically, t-dodecylmercaptan. Further, the molecular weight modifier may be added in an amount of 0.1 to 2 parts by weight, 0.2 to 1.5 parts by weight, or 0.3 to 1.0 part by weight based on 100 parts by weight of the total amount of the monomer. Within this range, the polymerization stability is excellent, and physical properties of the article are excellent when the article is manufactured after polymerization.

Further, according to an embodiment of the present invention, the polymerization in step (S10) may be performed by including an activator, the activator may be, for example, at least one selected from the group consisting of sodium formaldehyde, sulfoxylate, sodium ethylenediamine tetraacetate, ferrous sulfate, dextrose, sodium pyrophosphate, and sodium sulfite. Further, the activator may be added in an amount of 0.001 to 5 parts by weight based on 100 parts by weight of the total amount of the monomer.

Further, according to an embodiment of the present invention, the polymerization may be performed in water, specifically deionized water, as a medium. In order to ensure polymerization easiness, the polymerization may be performed by further including an additive such as a chelating agent, a dispersant, a pH adjuster, a deoxidizer, a particle size regulator, an antioxidant, an oxygen scavenger, or the like, if necessary. According to an embodiment of the present invention, the emulsifier, the polymerization initiator, the molecular weight modifier, the additive, and the like, may be added to a polymerization reactor at a time or separately, and may be continuously added at the time of each addition which is the same as the monomer mixture.

Further, according to an embodiment of the present invention, the polymerization may be performed at a polymerization temperature of 10° C. to 90° C., 20° C. to 80° C., or 25° C. to 75° C. Within this range, latex stability is excellent.

Meanwhile, according to an embodiment of the present invention, the method for preparing a carboxylic acid-modified nitrile-based copolymer latex may include obtaining a carboxylic acid-modified nitrile-based copolymer latex by terminating the polymerization reaction. The polymerization reaction may be terminated at a polymerization conversion rate of 90% or more, or 92% to 99.9%, and may be performed by adding a polymerization terminator, a pH adjuster, and an antioxidant. Further, the method for preparing a carboxylic acid-modified nitrile-based copolymer latex may further include removing unreacted monomers by a deodorization process after the reaction is terminated.

Further, according to the present invention, there is provided a latex composition for dip-forming including the carboxylic acid-modified nitrile-based copolymer latex. The latex composition for dip-forming may include the carboxylic acid-modified nitrile-based copolymer latex and a polyvalent metal cation compound. The polyvalent metal cation compound may be a crosslinking agent for performing crosslinking through ionic bonding or covalent bonding with a carboxylic group present in a large amount on the surface of the copolymer particles in the carboxylic acid-modified nitrile-based copolymer latex so that crosslinking is possible even without using sulfur and a vulcanization accelerator or a crosslinking agent such as zinc oxide.

According to an embodiment of the present invention, the polyvalent metal cation compound may be at least one selected from the group consisting of aluminum hydroxide, aluminum sulfate, aluminum chloride, aluminum lactate, and aluminum acetylacetonate. When the aluminum cation compound is used as a crosslinking agent for ionic bonding or covalent bonding as described above, it is possible to prevent weakening of the bonding in an acidic solution, thereby preventing a strength of the dip-formed article from being lowered.

In addition, according to an embodiment of the present invention, an amount of the polyvalent metal cation compound may be 0.1 to 5 parts by weight, 0.5 to 5 parts by weight, or 0.5 to 4 parts by weight, based on 100 parts by weight (based on solid content) of the carboxylic acid-modified nitrile-based copolymer latex. Within this range, it is possible to prevent the weakening of the bonding in the acidic solution, thereby preventing a strength of the dip-formed article from being lowered.

In addition, according to an embodiment of the present invention, if necessary, the latex composition for dip-forming may further include an additive such as a pigment such as titanium dioxide, or the like, a filler such as silica, a thickener, a pH adjuster, or the like.

In addition, according to an embodiment of the present invention, the latex composition for dip-forming may have, for example, a solid content (concentration) of 5 wt % to 40 wt %, 8 wt % to 35 wt %, or 10 wt % to 33 wt %. Within this range, an efficiency of transporting latex is excellent, and storage stability is excellent by preventing an increase in latex viscosity.

As another example, the latex composition for dip-forming may have a pH of 9 to 12, 9 to 11.5, or 10 to 11.5. Within this range, the processability and productivity are excellent at the time of manufacturing a dip-foamed article. The pH of the latex composition for dip-forming may be adjusted by the addition of the pH adjuster described above. The pH adjuster may be, for example, an aqueous solution of potassium hydroxide having a concentration of 1 wt % to 5 wt %, or ammonia water having a concentration of 1 wt % to 5 wt %.

According to the present invention, there is provided an article including: a layer derived from the latex composition for dip-forming as described above. The article may be a dip-formed article manufactured by dip-forming the latex composition for dip-forming, and an article including: a layer derived from the latex composition for dip-forming, which is formed from the latex composition for dip-forming. A method for manufacturing an article for forming the article may include immersing the latex composition for dip-forming by a direct dipping method, an anode adhesion dipping method, a Teague adhesion dipping method, or the like. As a specific example, the method for manufacturing an article for forming the article may be performed by anode adhesion dipping method, and in this case, there is an advantage of obtaining a dip-formed article having a uniform thickness.

As a specific example, the method for manufacturing a formed article may include attaching a coagulant to a dip-forming mold (S100); immersing the dip-forming mold having the coagulant attached thereto in a latex composition for dip-forming to form a layer derived from the latex composition for dip-forming, i.e., a dip-formed layer (S200); and heating the dip-formed layer to crosslink the latex composition for dip-forming (S300).

According to an embodiment of the present invention, the step (S100) may be performed, in order to form the coagulant in the dip-forming mold, by immersing the dip forming mold in a coagulant solution to attach the coagulant to a surface of the dip-forming mold, wherein the coagulant solution is a solution in which the coagulant is dissolved in water, an alcohol or a mixture thereof, and an amount of the coagulant in the coagulant solution may be 5 wt % to 75 wt %, or 15 wt % to 55 wt % based on the total amount of the coagulant solution. The coagulant may be, for example, at least one selected from the group consisting of metal halides such as barium chloride, calcium chloride, magnesium chloride, zinc chloride, and aluminum chloride, and the like; nitrates such as barium nitrate, calcium nitrate, and zinc nitrate, and the like; acetic acid salts such as barium acetate, calcium acetate, and zinc acetate, and the like; and sulfates such as calcium sulfate, magnesium sulfate, and aluminum sulfate, and the like. The coagulant may be specifically calcium chloride or calcium nitrate.

Further, according to an embodiment of the present invention, the step (S200) may be performed, in order to form the dip-forming layer, by immersing the dip-forming mold having a coagulant attached thereto in the latex composition for dip-forming according to the present invention, taking out the dip-forming mold, and forming the dip-forming layer in the dip-forming mold.

In addition, according to an embodiment of the present invention, the step (S300) may be performed, in order to obtain the dip-formed article, by heating the dip-forming layer formed in the dip-forming mold to evaporate a liquid component, and crosslinking the latex composition for dip-forming to proceed with curing. At this time, when the latex composition for dip-forming according to the present invention is used, it is possible to perform crosslinking by ionic bonding or covalent bonding with the polyvalent metal cation compound included in the latex composition for dip-forming. Thus, there are no problems such as an allergic reaction, and the like, due to the sulfur and the vulcanization accelerator.

According to an embodiment of the present invention, the article may be a glove such as a surgical glove, an inspection glove, an industrial glove, a household glove, or the like, a condom, a catheter, or a health care product.

Hereinafter, the following Examples of the present invention are described in more detail. It is obvious to those skilled in the art, however, that the following Examples are illustrative of the present invention and that various changes and modifications can be made within the scope and spirit of the invention, and thus the scope of the present invention is not limited thereto.

EXAMPLE

Example 1

Preparation of Carboxylic Acid-Modified Nitrile-Based Copolymer Latex

A 10 L high-pressure polymerization reactor equipped with the inlet so that a thermometer, a cooler, a nitrogen gas inlet, a monomer, an emulsifier, and a polymerization initiator were capable of being continuously added was substituted with nitrogen, then 100 parts by weight of a monomer including 32 wt % of acrylonitrile, 62.5 wt % of 1,3-butadiene, and 5.5 wt % of methacrylic acid, 2.5 parts by weight of sodium alkylbenzenesulfonate, 0.5 part by weight of t-dodecyl mercaptan, and 140 parts by weight of ion-exchanged water were added, and the mixture was heated to 40° C. After the heating was completed, 0.25 parts by weight of potassium persulfate as a polymerization initiator was added to initiate polymerization. 1 part by weight of dopamine methacrylamide was added at the time when the polymerization conversion rate was 30%. Thereafter, when the polymerization conversion rate reached 94%, 0.3 parts by weight of ammonium hydroxide was added to terminate the polymerization. Subsequently, unreacted monomers were removed through a deodorization process, and ammonia water, an antioxidant and a defoaming agent were added to obtain a carboxylic acid-modified nitrile-based copolymer latex having a solid content concentration of 45 wt % and a pH of 8.5.

Preparation of Latex Composition for Dip-Forming

To 100 parts by weight (based on solid content) of the obtained carboxylic acid-modified nitrile-based copolymer latex, 2 parts by weight of a potassium hydroxide solution, 1 part by weight of aluminum acetylacetonate, 1 part by weight of titanium oxide (BOSTEX 497D), and secondary distilled water were added to obtain a latex composition for dip-forming having a solid content concentration of 20 wt % and a pH of 10.

<Manufacture of Dip-Formed Article>

15 parts by weight of calcium nitrate, 84.5 parts by weight of water and 0.5 part by weight of wetting agent (Teric 320, Huntsman Corporation, Australia) were mixed to prepare a coagulant solution. A hand-shaped ceramic mold was immersed in the prepared coagulant solution for 30 seconds, and then taken out and dried at 80° C. for 4 minutes to coat the coagulant onto the hand-shaped mold.

Thereafter, the mold coated with the coagulant was immersed in the obtained latex composition for dip-forming for 30 seconds, taken out, dried at 80° C. for 2 minutes. Then, the mold was leached by immersing the mold in water for 3 minutes, then the mold was dried again at 80° C. for 3 minutes and then crosslinked at 130° C. for 20 minutes. The crosslinked dip-forming layer was peeled off from the hand-shaped mold to obtain a glove-shaped dip-formed article.

Example 2

Example 2 was performed in the same manner as in Example 1, except that dopamine methacrylamide was added in an amount of 2 parts by weight instead of 1 part by weight at the time of preparing the carboxylic acid-modified nitrile-based copolymer latex in Example 1.

Example 3

Example 3 was performed in the same manner as in Example 1, except that dopamine methacrylamide was added in an amount of 3 parts by weight instead of 1 part by weight at the time of preparing the carboxylic acid-modified nitrile-based copolymer latex in Example 1.

Example 4

Example 4 was performed in the same manner as in Example 1, except that aluminum acetylacetonate was added in an amount of 2 parts by weight instead of 1 part by weight at the time of preparing the latex composition for dip-forming in Example 1.

Example 5

Example 5 was performed in the same manner as in Example 1, except that dopamine methacrylamide was added in an amount of 0.1 parts by weight instead of 1 part by weight at the time of preparing the carboxylic acid-modified nitrile-based copolymer latex in Example 1.

Example 6

Example 6 was performed in the same manner as in Example 1, except that dopamine methacrylamide was added in an amount of 7 parts by weight instead of 1 part by weight at the time of preparing the carboxylic acid-modified nitrile-based copolymer latex in Example 1.

Comparative Example 1

Comparative Example 1 was performed in the same manner as in Example 1, except that 1 part by weight of the dopamine methacrylamide was not added at the time when the polymerization conversion rate was 30% at the time of preparing the carboxylic acid-modified nitrile-based copolymer latex in Example 1.

Comparative Example 2

Comparative Example 2 was performed in the same manner as in Comparative Example 1, except that 1 part by weight of the aluminum acetylacetonate was not added at the time of preparing the latex composition for dip-forming in Comparative Example 1.

Experimental Example

In order to compare physical properties of the respective dip-formed articles manufactured in Examples 1 to 6 and Comparative Examples 1 and 2, tensile properties of tensile strength, elongation, and stress at 300% elongation, durability, and chemical resistance were measured, and are shown in Table 1 below.

Tensile properties: The respective dip-formed articles manufactured in Examples and Comparative Examples were used to manufacture dumbbell-shaped test pieces according to EN 455-2, respectively. Each test piece was pulled at a stretching speed of 500 mm/min, and the stress when the elongation was 300%, the tensile strength at breakage, and the elongation at breakage were measured.

Durability: The test piece having a shape of Chinese character 之 was immersed in an artificial sweat solution and 200% elongated, and the number of times when the test piece was broken was measured.

Chemical resistance: The respective formed articles manufactured in Examples and Comparative Examples were used to manufacture test pieces, respectively, in accordance with EN374-3:2003. Each test piece was brought into contact with a test vessel having a diameter of 51 mm and a depth of 35 mm containing hexane, which was a material to be measured for chemical resistance, and the time required for hexane to permeate the test piece at a rate of 1 μg/cm²/min was measured.

TABLE 1

| Classification | Example | | | | | | Comparative Example | |
|---|---|---|---|---|---|---|---|---|
| | 1 | 2 | 3 | 4 | 5 | 6 | 1 | 2 |
| Thickness (mm) | 0.065 | 0.065 | 0.064 | 0.065 | 0.063 | 0.065 | 0.064 | 0.065 |
| Tensile strength (MPa) | 31 | 34 | 35 | 37 | 23 | 34 | 23 | 18 |
| Elongation (%) | 636 | 627 | 628 | 620 | 598 | 521 | 603 | 513 |
| 300% Modulus (MPa) | 6.2 | 6.8 | 7.1 | 7.5 | 5.1 | 6.5 | 5.4 | 3.0 |
| Durability (times) | 449 | 595 | 642 | 687 | 262 | 415 | 297 | 94 |
| Chemical resistance (min) | 35 | 40 | 40 | 40 | 15 | 30 | 15 | 5 |

As shown in Table 1, it could be confirmed that in Examples 1 to 6 in which the dip-formed article was manufactured using the latex composition for dip-forming including the carboxylic acid-modified nitrile-based copolymer latex and the polyvalent metal cation compound prepared according to the present invention, even though the polyvalent metal cation compound was included, all of the tensile properties of tensile strength, elongation, and 300% modulus were improved, and the durability and the chemical resistance were remarkably improved as compared with Comparative Example 1 in which the carboxylic acid-modified nitrile-based copolymer latex without including the repeating unit derived from the monomer represented by Chemical Formula 1 was used.

In addition, as compared with Comparative Example 1, it could be confirmed that in Comparative Example 2 in which the polyvalent metal cationic compound was not included, all of the tensile properties, durability, and chemical resistance were very poor since a crosslinking part was not formed completely.

This is considered to be generated since the binding force of the ionic bonding and the covalent bonding between the polyvalent metal cation compound and the functional group derived from the repeating unit derived from the monomer represented by Chemical Formula 1 present on the surface of the carboxylic acid-modified nitrile-based copolymer particles of the carboxylic acid-modified nitrile-based copolymer latex is improved.

The present inventors confirmed from the above-described results that when the carboxylic acid-modified nitrile-based copolymer latex was prepared according to the present invention and a dip-formed article was formed by using the latex composition for dip-forming including the same, it was possible to induce crosslinking through ionic bonding or covalent bonding of the polyvalent metal cation compound without using sulfur and a vulcanization accelerator, to maintain physical properties of the dip-formed article at the same level or higher, and to secure durability against human sweat, and the like, and chemical resistance against solvents, organic substances, and the like.

The invention claimed is:

1. A carboxylic acid-modified nitrile-based copolymer latex comprising:
   a carboxylic acid-modified nitrile-based copolymer including a monomer-derived repeating unit; and a repeating unit derived from a monomer represented by Chemical Formula 1 below,
   the monomer-derived repeating unit including a conjugated diene-based monomer-derived repeating unit, an ethylenically unsaturated nitrile-based monomer-derived repeating unit, and an ethylenically unsaturated acid monomer-derived repeating unit:

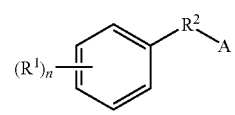

[Chemical Formula 1]

wherein, $R^1$ is a hydroxyl group or a mercapto group, $R^2$ is a C1-C10 alkylene group, A is an unsaturated group, and n is an integer selected from 1 to 5.

2. The carboxylic acid-modified nitrile-based copolymer latex of claim 1, wherein $R^1$ is a hydroxyl group, $R^2$ is a C1-C5 alkylene group, A is a (meth)acrylamide group or an allyl amide group, and n is an integer selected from 2 to 3.

3. The carboxylic acid-modified nitrile-based copolymer latex of claim 1, wherein the monomer represented by Chemical Formula 1 is represented by Chemical Formula 2 below:

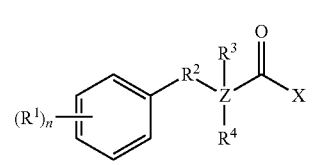

[Chemical Formula 2]

wherein, $R^1$ is a hydroxy group or a mercapto group, $R^2$ is a C1-C10 alkylene group, $R^3$ and $R^4$ are each independently hydrogen, a C1-C10 alkyl group, or an amine group, Z is a carbon atom or a nitrogen atom, wherein when Z is the carbon atom, at least one of $R^3$ and $R^4$ is necessarily an amine group, and when Z is the nitrogen atom, $R^3$ is not present, X is a vinyl group, an allyl group or a 2-isopropenyl group, and n is an integer selected from 1 to 5.

4. The carboxylic acid-modified nitrile-based copolymer latex of claim 1, wherein the monomer represented by Chemical Formula 1 comprises dopamine (meth)acrylamide, N-(3,4-dihydroxyphenethyl)acrylamide, or dopamine allylamide.

5. The carboxylic acid-modified nitrile-based copolymer latex of claim 1, wherein an amount of the repeating unit derived from the monomer represented by Chemical Formula 1 is 0.5 to 5 parts by weight based on 100 parts by weight of a total amount of the monomer-derived repeating unit.

6. A method for preparing a carboxylic acid-modified nitrile-based copolymer latex, comprising:

adding and polymerizing a monomer including a conjugated diene-based monomer, an ethylenically unsaturated nitrile-based monomer, and an ethylenically unsaturated acid monomer; and a monomer represented by Chemical Formula 1 below or a polymer including a repeating unit derived from the monomer represented by Chemical Formula 1 below:

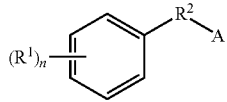

[Chemical Formula 1]

wherein, $R^1$ is a hydroxy group or a mercapto group, $R^2$ is a C1-C10 alkylene group, A is an unsaturated group, and n is an integer selected from 1 to 5.

7. The method of claim 6, wherein:

(i) an entire amount of each of the conjugated diene-based monomer, the ethylenically unsaturated nitrile-based monomer, the ethylenically unsaturated acid monomer, the monomer represented by Chemical Formula 1, and the polymer including the repeating unit derived from the monomer represented by Chemical Formula 1 is independently added before the polymerization is initiated; or (ii) a part thereof is added before the polymerization is initiated and a remaining amount thereof is added at a polymerization conversion rate of 10% to 50% after the polymerization is initiated; or (iii) the entire amount thereof is added at the polymerization conversion rate of 10% to 50% after the polymerization is initiated.

8. The method of claim 7, wherein at the time of the polymerization of step (S10), the monomer including the conjugated diene-based monomer, the ethylenically unsaturated nitrile-based monomer, and the ethylenically unsaturated acid monomer is added with an entire amount before the polymerization is initiated; and the monomer represented by Chemical Formula 1, or the polymer including the repeating unit derived from the monomer represented by Chemical Formula 1 is added with the entire amount at the polymerization conversion rate of 10% to 50% after the polymerization is initiated.

9. The method of claim 6, wherein the polymer including the repeating unit derived from the monomer represented by Chemical Formula 1 has a weight average molecular weight of 100 g/mol to 200,000 g/mol.

10. A latex composition for dip-forming comprising:

the carboxylic acid-modified nitrile-based copolymer latex of claim 1; and a polyvalent metal cation compound.

11. The latex composition for dip-forming of claim 10, wherein the polyvalent metal cation compound comprises aluminum hydroxide, aluminum sulfate, aluminum chloride, aluminum lactate, or aluminum acetylacetonate.

12. The latex composition for dip-forming of claim 10, wherein an amount of the polyvalent metal cation compound is 0.1 parts by weight to 5 parts by weight based on 100 parts by weight of the carboxylic acid-modified nitrile-based copolymer latex based on solid content.

13. An article comprising:

a layer derived from the latex composition for dip-forming of claim 10.

* * * * *